Jan. 6, 1953  A. F. HEDBERG ET AL  2,624,243
COMBINED TOOL FOR MACHINING GUIDE RIBS
Filed Oct. 6, 1949  3 Sheets-Sheet 1

Inventors.
Albert F. Hedberg &
Emil Langner.
By Joseph O. Lange Atty.

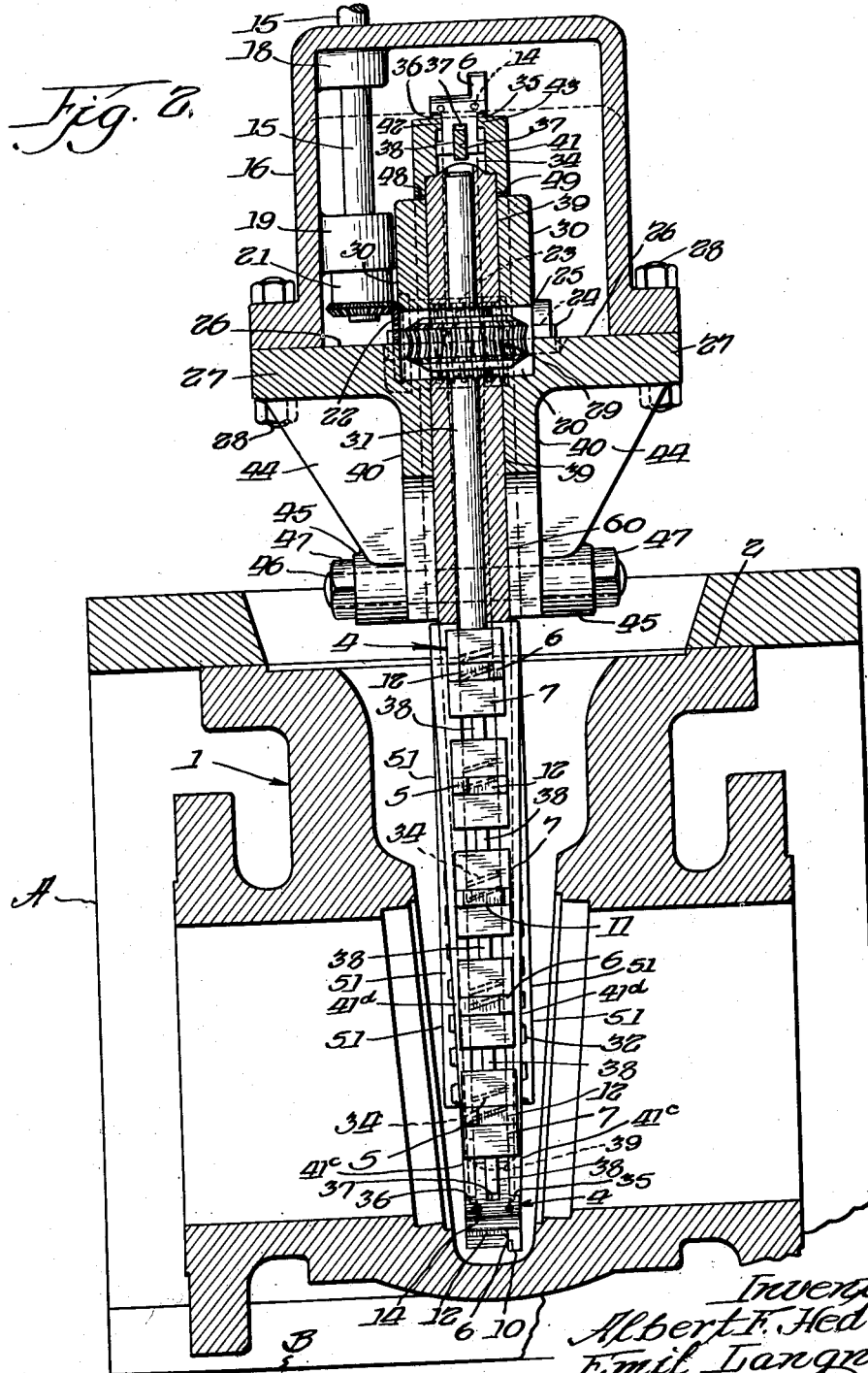

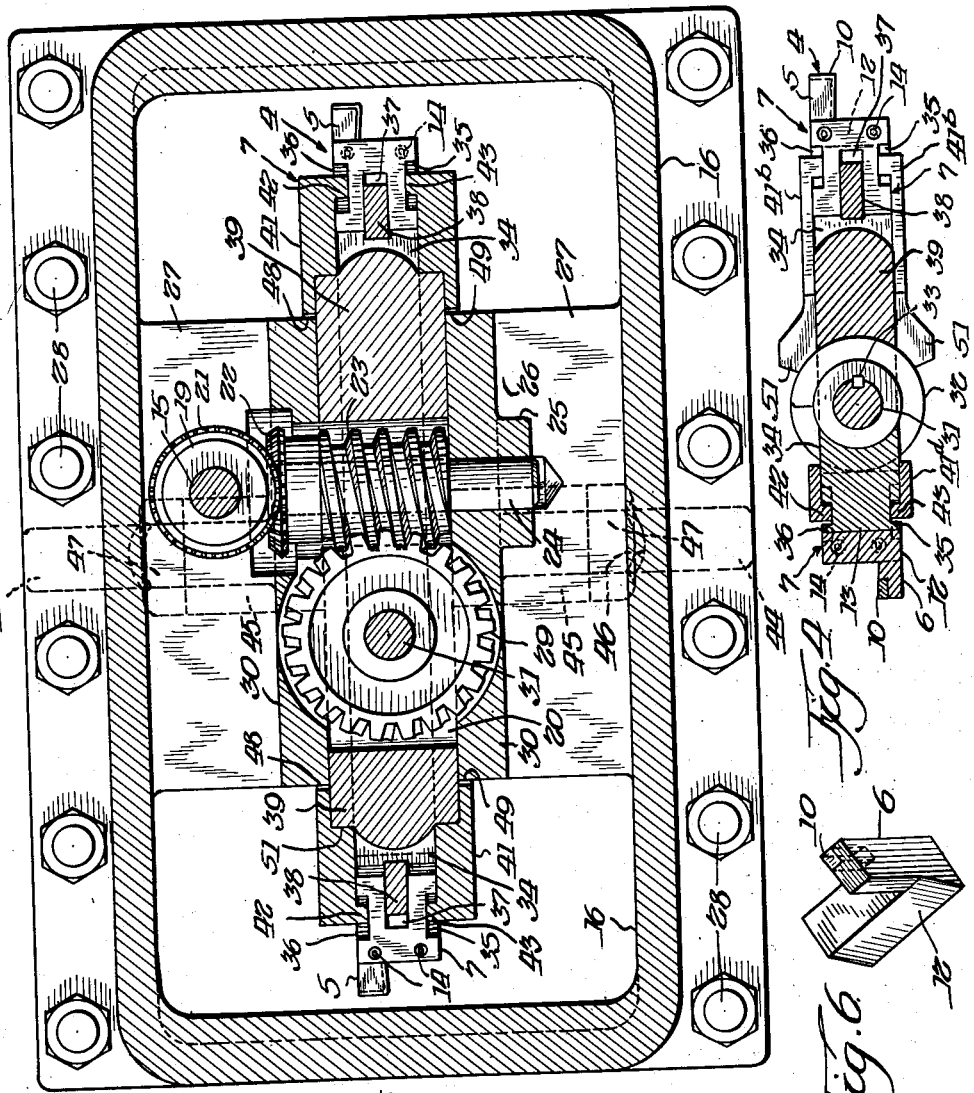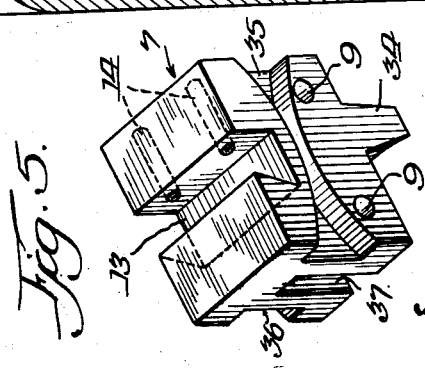

Patented Jan. 6, 1953

2,624,243

UNITED STATES PATENT OFFICE 2,624,243

COMBINED TOOL FOR MACHINING GUIDE RIBS

Albert F. Hedberg and Emil Langner, Chicago, Ill., assignors to Crane Co., Chicago, Ill., a corporation Application October 6, 1949, Serial No. 119,822

5 Claims. (Cl. 90—33)

This invention relates to a novel combined tool for machining guide ribs or the like, as gate valve bodies, for example, in which accurately machined surfaces are required for the purpose of guiding a gate valve disc or closure member in the course of its movement reciprocably between the opened and closed positions of the valve.

More particularly, this invention is concerned with a novel milling head and fixture suitable for use with a drill press spindle as the prime mover, for example, in machining the internal plain surfaces of longitudinal form in which a plurality of cutting tools in looped chain-like arrangement are mounted in a continuous assembly, whereby preferably spaced-apart alternately positioned cutting edges may be used to finish the contact surfaces of the guide ribs in such valve body or similar interior surface installation.

Heretofore, these interior machining or facing operations have been slow, costly, and relatively difficult to perform, especially on a large production basis, and this invention overcomes such earlier objections to the prior methods employed because it is quickly accomplished, accurate and relatively easy to set up.

Other important objects and advantages of this invention and the broadness of its application in general will become more readily apparent upon proceeding with a reading of the specification in light of the accompanying drawings, in which Fig. 1 is a fragmentary sectional assembly view showing a preferred form of our invention and its application.

Fig. 2 is a fragmentary sectional view showing an end portion of a continuous cutting tool member and is taken on the line 2—2 of Fig. 1.

Fig. 3 is a magnified sectional view taken on the line 3—3 of Fig. 1.

Fig. 4 is a sectional view of the combined tool and block conveyor assembly, taken on the line 4—4 of Fig. 1.

Fig. 5 is an exterior perspective view of one form of the novel tool block or holding member.

Fig. 6 is an exterior perspective view of one of the cutters employed with block shown in Fig. 5.

Similar reference characters apply to similar parts throughout the several figures.

Figure 1:
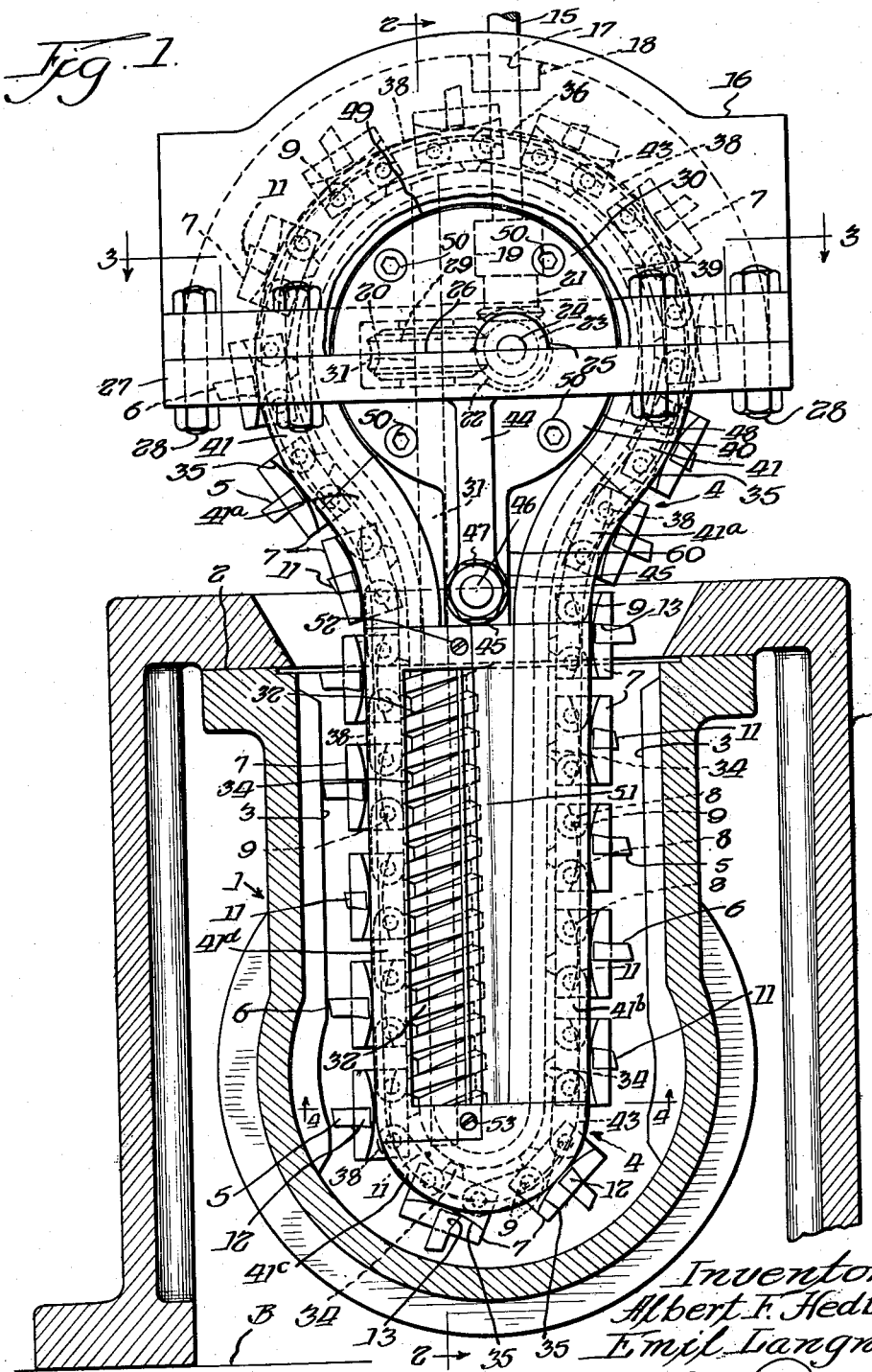

Referring now to Fig. 1, the numeral 1 is used to designate generally for purposes of illustration a gate valve body which is rigidly and firmly supported for machining purposes in the supporting or holding fixture A and is supported upon the base B. The upper portion of the valve body, as indicated at 2, constitutes the surface normally forming the bonnet connection or attachment for the valve upper structure, which, for brevity of reference, is of the conventional type shown in Crane Co. Catalog No. 49 on page 228. For purpose of this invention, the valve body 1 may be bolted or otherwise attached to the supporting fixture A for the desired machining or finishing as hereinafter described. The interior of the gate valve body 1 is provided with the usual oppositely disposed integral guide ribs 3 which, as a matter of explanation, in actual valve service on a pipe line perform the important function of guiding the gate or closure member relatively closely against transverse movement during the opening and closing operations of the said valve.

It is, of course, essential that these contact surfaces of the valve body guide ribs should be machined very accurately and also relatively smoothly in order to facilitate such ease of movement of the valve closure member during its travel from the open to closed position and vice versa without an tearing of metal or promoting undue friction between the reciprocably movable closure and the casing. It should be further understood that the guide surfaces 3 are used not only in keeping the closure member in proper alignment relative to the body, but also to assist the closure member in resisting the adverse effect of counter-flow of fluid and objectionable turbulence within the valve body, the accumulation of high pressures and the flow of high velocity fluids being regulated or controlled by the operation of the valve closure member axially or longitudinally along the casing guide 3.

Broadly, this invention might be described in its manner of functioning as an excavator type of tool employing multiple cutters linked together. It consists essentially of a continuous or endless chain-like series of cutting tools, generally designated 4, comprising a plurality of superposed cutting members, such as the left cutters 5, right cutters 6, and the center cutter 11, each of which is selectively mounted securely in a plurality of complementary link-connected tool blocks or holders, generally designated 7. The latter members are joined, as indicated, by means of the pins 8, receivable within the through apertures 9 of the block 7, each block being connected to the next adjoining block by means of the connecting links, thereby to form a continuous loop or chain, as hereinafter described in greater detail.

As shown more clearly by referring to Fig. 6, the tool bits or cutters 5, 6, and 11 are preferably provided with the usual hardened cutting edge surfaces 10 and also with a shank or holding portion 12 receivable relatively snugly within a similarly shaped recess 13 on the tool holder or block 7 (see Fig. 5). To hold the cutters securely when the latter are assembled within the blocks 7, the latter are provided, as at 14, with tapped holes to receive set-screws (not shown), the latter when tightened in place bearing laterally against the cutting tool shank 12 receivable within the recess 13 (Fig. 5). It should, of course, be understood that the shape and size of these cutters will vary, depending upon the specific nature and speed of the machining operation to be performed. In the latter connection, it should also be clear that while the description herein is primarily concerned with the machining of a surface portion of a gate valve body, such as the guide ribs, for example, the invention may be applied broadly to many varieties and forms of hollow bodies in which inner surface machining operations are to be done. Thus, it is conceivable that the shape of the cutters and the work to which they are applied may bear no resemblance in appearance to the herein described device, but yet embody the spirit of the invention. Similarly, the detailed manner of joining or coupling the cutters and the blocks together may be changed to suit the job assignment in hand.

The foregoing description relates generally to the endless chain type of combined blocks and cutters, as hereinafter described in more detail, which chain is arranged to move in a clockwise direction (when looking at Fig. 1) to perform the cutting or facing operation of the guide rib 3 or a similar vertically extending surface or surfaces.

It should, of course, be appreciated at the outset that it is important to provide in this type of operation for a positive, steady, and uniform drive for the cutting tools, and while this objective may be accomplished in a number of different ways, one of the preferred forms found to be practical and relatively simple is the tool and drive arrangement about to be described.

Referring to Fig. 1, the vertical upper shaft 15 may be assumed as being connected to any desired prime mover, motor or other driving means, such as the rotating spindle of a drill press, for example. At its upper end, the shaft 15 may be connected to a drill chuck or spindle (not shown) from which the rotating driving force is derived. The housing 16, which may be mounted and rigidly and firmly supported against objectionable transverse movement by any suitable means (not shown) is provided with the bearing aperture 17 within which the rotating shaft 15 is journalled, the housing 16 preferably being provided with an inner integral boss 18 for additional journaling support. As shown more clearly in Fig. 2, for improved alignment and axial support of the shaft 15, the housing 16 below the boss 18 in spaced-apart relation is also provided with a similar integral boss 19.

Non-rotatably attached to the shaft 15, the bevel gear 21 is mounted and provided with its gear teeth, as indicated, in mesh with the transversely mounted bevel gear 22. The latter gear member, as shown more clearly in Fig. 3, is integrally a part of the worm 23. The latter member also is provided for improved journalling purposes with a reduced end extension or shaft 24 supported journally in the transversely extending boss 25. In the latter connection, it should be noted that the boss 25 is preferably made integral with the upper surface 26 of the supporting split plate 27, the latter member being attached by means of the studs 28 to the lower portion of the top cover or housing 16. Each half of the split plate 27 is provided with the upper angular oppositely disposed extension or partition 30, as shown.

The worm 23, which is rotated by the gear 21, as shown more clearly in Fig. 3, is accommodated within the upper chamber 20 and engages the worm gear 29, which is also received within the said chamber. The worm gear 29 is non-rotatably connected to shaft 31, and at its lower end portion, as shown more clearly in Fig. 1, it cooperates with the vertically extending spiral feed-screw 32. As shown in Fig. 4, it is non-rotatably maintained relative to the shaft 31 by means of the pin or key 33.

It will be further noted in referring to Fig. 1, that each of the tool blocks 7 is provided with the rear integral transverse extension or lug 34 of predeterminedly defined shape suitable for accurate engagement with the threads of the feed screw 32, as shown. Thus, it should now be clear that with the instant described arrangement, as the feed-screw 32 is predeterminedly rotated, the linked blocks 7, linked together as hereinafter explained in greater detail, will ride upwardly on the threads of the feed-screw 32 to move transversely across the surface for the desired machining as established by the respective cutters 5, 6, and 11. Depending upon the size of the surface to be machined, the number of tool cutter blocks having actual engagement with the rotating feed screw 32 will vary, and will be contingent upon the spacing employed between the respective tool blocks and also considering the length of the feed-screw required for the interior finishing operation.

In considering the nature of a metal surface finishing operation, it should, of course, be apparent that merely to provide for hingedly-connected tool blocks for supporting a series of cutters to form an endless chain is not ordinarily sufficiently rigid or strong to accomplish such cutting or finish in a satisfactory and accurate manner, especially in such applications in which relatively long or extended surfaces, such as those constituting the body guide 3, may be encountered.

Therefore, while it is one of the more important objects of this invention to provide not only a driving mechanism and conveyor means to constitute an endless chain or excavator arrangement of machining tools or cutters, it is also desirable to provide in cooperation therewith for a substantial support and guide for the cutters and the blocks, the latter guides and supports being particularly effective during the actual course of cutting or finishing the valve body surfaces 3, for example.

In the latter connection, in order to obtain a better understanding of the manner in which such support of the cutting tools is accomplished, it should be noted, as more clearly indicated in Fig. 5, that the tool supporting blocks 7 on the rear side are provided with the integral drive lug 34 engaged by the feed screw 32 for driving the tool block, the drive lug corresponding with the pitch of the threads of said drive screw. On each side, the block 7 is provided with the oppositely disposed arcuately defined grooves 35 and 36. Each block is also furnished with a center groove 37 for receiving and engaging a flat plate form of link, designated 38, and which is of the general configuration shown in Fig. 1. Each link is connected to the next adjoining block 7 by means of the pins 8 receivable within the said apertures 9 of the tool block.

In addition, as shown in Fig. 1, arrangement is made for substantial and relatively rigidly mounted upper arcuate supporting tracks 41 extending approximately 270 degrees, the arcuate tracks 41a on each side of the body 39, one track 41b on the backside of the body away from feed-screw 32, and at the bottom of the body interior a semi-circular track portion 41c which extends as upwardly as 41d over the feed screw 32. The instant described structure provides for perimetral movement of the respective tool blocks, cutters, and the link mechanism above referred to and is best understood by referring at the outset to Figs. 1 and 2. In the latter figure, it will be noted that the split plate 27 supported from the bolting provided by the flanged cap 16 is not only arranged with the upper angularly extending and spaced-apart partitions 30, but also depending from under portion thereof, it is provided with downwardly extending angular partitions 40, between which latter partitions the body or track supporting member 39 is held in firmly clamped relation. The contour of the body 39 is substantially circular following the outlines of the respective rounded surfaces 48 and 49 of the partitions 30, except for its lower projecting portion 60, which is of the shape shown more clearly in Fig. 1. As previously referred to herein and as more clearly shown in Fig. 3, the body or supporting member 39 is provided with the hollow chamber 20 within which a portion of the shaft 31 is journalled and the actuating worm 23 and the worm gear 29 are also contained.

Thus, it will be apparent that closely arranged around substantially the entire periphery of the body member 39, the track member 41 is mounted, which in assembly, is of substantially U-configuration, comprising the previously referred to members 41, 41a, 41b, 41c, and 41d. The track sections are provided with the oppositely disposed inwardly projecting flanges 42 and 43, respectively engaging each of the grooves 35 and 36 of the tool block member 7. The supporting plate 27, in order to provide for greater strength and rigidity, is reinforced with the oppositely disposed stiffening ribs 44 (see Fig. 2), the lowermost end thereof preferably being defined by an integral hollow boss 45 extending through on both sides of the lower partitions 40 to permit insertion of the stud 46 and the nuts 47 partially to hold the said assembly in firmly clamped relation to the body 39. In addition to the clamping means provided by the stud and nut 46 and 47 respectively, it has also been found desirable to employ the additional spaced-apart throughbolts 50 to clamp and to support the body 39 between the members 30, as shown in Fig. 1. Thus, the body member 39 is a unitary casting serving as a support for the driving mechanisms and is surrounded on its extremities by the tracks 41 and 41c, bearing at the top portion against the surfaces 48 and 49 of the body. The lower looped portion of the track portion 41c, as shown in Fig. 1, extends beyond the end of the body 39 and around the lower end limits thereof, whereby to provide a substantially continuous and complete support for the circuitous travel of the linked block and cutter tool during the machining operation. The track portion 41d adjacent the worm screw is preferably attached to the body 39 by means of the screws 52 and 53. In order to hold the feed-screw 32 firmly against transverse movement during the course of its being rotated by the revolving shaft 31 and especially while the said cutting operation is in progress, a further strengthening supporting projecting member 51 is preferably provided which is of arcuate form (Fig. 4) and is integral with the body 39. Thus, when the entire tool and holder conveyor assembly is placed within the valve body 1 and the cutters are placed in machining position, the feed-screw 32 is so firmly supported as to inhibit substantial transverse movement or objectionable retraction of the cutting tools 5, 6, and 11 which condition might otherwise take place due to the spring or give of the feed-screw 32, arising from the torque encountered during the machining operations. The detailed manner in which this structural arrangement provides for such support of the feed-screw and cutters is shown more clearly in the transverse sectional view of Fig. 4.

Positioning of the valve body or other article being machined whereby to adjust the size or depth of the cut and also the proper movement of the cutters in relation to the surfaces being machined is easily accomplished by merely moving the holding fixture A as required along the base B and then firmly placing the fixture in the desired position for such subsequent machining.

In summary, it will be apparent that in employing this invention, substantial progress has been made in accelerating inside surface finishing operations and also doing so in a manner that is flexible, accurate, durable, and labor-saving. In the latter connection, it should also be apparent that its novelty resides not merely in the single mechanism as described immediately above, but also in the arrangement of a plurality of such mechanisms when paralleled with a number of assembled driving means allows for machining a plurality of articles simultaneously. Thus, the particular form of constructions may vary substantially from that illustrated and described.

Therefore, it is the desire not to be limited to the precise construction, arrangement, and operation of parts as hereinabove shown and described, since it is manifest that many variations or modifications in the detailed structures and arrangement may be employed without departing from the spirit and scope of our invention.

Reservation of the right is therefore made to all such variations and modifications as properly fall within the scope of our improvements and the terms of the following claims.

We claim:

1. In a tool for machining guide ribs in a valve body or the like, the combination including a plurality of cutting heads, holders for said cutters, rotatable driving means therefor, a rigidly mounted housing for the said driving means, said cutting heads being mounted in continuous chain-like arrangement relatively to each other, the cutting heads having end disposed cutting surfaces, said driving means including an extension therefrom, the said extension being engageable with a back portion of the said cutting heads at predetermined intervals during the cutting movement of said cutting heads, and said driving means also serving to guide the said cutting heads against transverse movement during the cutting operation, a portion of the said extension of the driving means being journalled in a depending portion in the said housing.

2. In a tool for machining guide ribs in a valve body or the like, the combination including a plurality of cutting heads, individual holders for each of the said cutters, geared driving means therefor, a housing for the driving means, said cutting heads being pivotally joined and mounted in continuous chain-like or linked arrangement relatively to each other, cutting heads having cutting surfaces, a substantially continuous track for the said cutting heads, the track being supported at its upper portion within said housing, said driving means communicating with a portion of the said cutting heads in the same plane at predetermined spacing on the chain to effect the driving movement of said cutting heads, and said driving means together with a depending lower portion of said driving means of U-configuration and supported by the housing also serving to maintain the said cutting heads in a substantially fixed vertical plane during the guide rib machining operation.

3. In a chain-like cutting tool assembly, the combination comprising a plurality of cutting heads mounted to form a continuous chain, a housing for an upper portion of the chain, driving means for the said heads comprising combined gears and shaft means extending in a plurality of planes within the said housing, suitably spaced track means cooperating with the said cutting heads, the said heads being linked together with predetermined pivotal movement therebetween to form said chain, a substantially rigidly mounted vertically extending feed-screw engaging a projecting back portion of the cutting heads during the machining operation, the said feed-screw being supported by said housing and having a shaft portion journalled within the said housing.

4. In a plurality of linked cutting tools for machining guide ribs in gate valve bodies or the like, the said tool consisting of cutting heads arranged to form an endless chain, a body and track for support of the cutting heads, gear means for driving the said heads on the said track around the said body, the said driving means comprising a feed-screw mounted within the body and having a projecting portion cooperating with a rear portion of the said cutting heads at a location on the chain to support the latter immediately adjacent the guide ribs being machined, the body having a curved portion with a reduced section cooperating with the cutting heads at an upper and side portion of the endless chain thereby to guide the latter inwardly within valve bodies or the like in a transverse space substantially smaller than that of the upper portion of the chain.

5. In a chain-like cutting tool assembly, the combination comprising a plurality of connected cutting heads, a removable housing for an upper portion of the assembled heads, a body for support of the chain suspended from the housing in clamped relation to the said housing, driving means for the said heads around the body and comprising gears and shaft means supported by said body within the said housing, a track for directing movement of the cutting heads, the latter heads being spaced apart and linked together to form said chain, carriers for the heads, a rotatable feed-screw cooperating with a rear relieved portion of the carriers to support the said heads against substantial transverse movement during the machining operation, the said feed-screw having an upper end portion journalled within the said housing, the cutting heads slidably engaging the said track.

ALBERT F. HEDBERG.
EMIL LANGNER.

REFERENCES CITED

The following references are of record in the file of this patent:

UNITED STATES PATENTS

| Number | Name | Date |
|---|---|---|
| 1,468,393 | Perkins et al. | Sept. 18, 1923 |
| 2,475,690 | Bonnafe | July 12, 1949 |

FOREIGN PATENTS

| Number | Country | Date |
|---|---|---|
| 8,238 | Great Britain | May 13, 1891 |
| 663,555 | France | Apr. 9, 1929 |